United States Patent
Soundararajan

(10) Patent No.: US 10,180,816 B1
(45) Date of Patent: Jan. 15, 2019

(54) METHODS AND SYSTEMS FOR SEGREGATING PRINTOUTS OF LARGE PRINT JOBS AND MINOR PRINT JOBS

(71) Applicant: XEROX CORPORATION, Norwalk, CT (US)

(72) Inventor: Arockia Raja Soundararajan, Trichy (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/646,417

(22) Filed: Jul. 11, 2017

(51) Int. Cl.
*G06F 3/12* (2006.01)
*H04N 1/00* (2006.01)

(52) U.S. Cl.
CPC .......... *G06F 3/1263* (2013.01); *G06F 3/1204* (2013.01); *G06F 3/1296* (2013.01); *H04N 1/00037* (2013.01); *H04N 1/00082* (2013.01); *H04N 1/0092* (2013.01); *H04N 1/00604* (2013.01); *H04N 1/00623* (2013.01); *H04N 1/00694* (2013.01); *H04N 1/00917* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 2009/0309296 A1* | 12/2009 | Taki | ...................... | B65H 31/22 271/220 |
| 2011/0236107 A1* | 9/2011 | Sugiura | ...................... | B41J 3/60 400/76 |
| 2012/0236351 A1* | 9/2012 | Arima | ................ | G06K 15/1809 358/1.13 |

* cited by examiner

*Primary Examiner* — Ngon B Nguyen

(57) ABSTRACT

The present disclosure discloses methods and systems for segregating large print jobs and minor print jobs. The method includes detecting a trigger event caused by receiving a new high priority job while an old print job is already under printing by a printer. The printer includes a paper collection tray installed in a paper collection area for receiving printouts of the high priority jobs. After receiving, printing of the old print job is paused and printing of the high priority is initiated. Then, a collection tray is moved to an extended position for receiving printouts of the high priority job into the collection tray. After successful printing of the new high priority job, printing of the old print job is resumed. Thereafter, the collection tray is moved back to the retracted position for receiving printouts in the collection area.

20 Claims, 4 Drawing Sheets

METHODS AND SYSTEMS FOR SEGREGATING PRINTOUTS OF LARGE PRINT JOBS AND MINOR PRINT JOBS

BACKGROUND

Conventionally, printers are configured to receive print commands from a plurality of connected devices such as mobile phones, computing devices or the like. The printer adds all the print commands in a queue based on the known concept of FIFO (first in first out). And further, the printers are not capable of shuffling the queues. As a result, if a large document printing command comes first to a printer followed by a print command of a minor document (e.g., one or two pages), the printer prints the large document first and keeps the print command of the minor document in the queue. This results in frustration to the person who is in urgency of printing just one or two pages.

For example, in offices, where a printer is shared between multiple users, a user may initiate printing of a document of hundred pages, which may take few minutes to print. Meanwhile, another user may come up with a requirement to print just one page of a letter. In such scenarios, one page letter may not be printed unless all the hundred pages of the documents are printed first. The only possible solution is to manually cancel the printing process of the hundred pages, then print the single page of letter, and re-start the printing of the hundred pages from the last printed page. This solution is not user friendly and is prone to human errors, which may lead to waste of time, energy, and resources.

Recently, due to advancements in the printing technology, few printers came up that are capable of prioritizing print commands over other print commands based on certain criteria and pre-set preferences. For example, prints from certain devices may be given priority over prints given from other devices. Additionally, an administrator may manually move a print job up in the queue. Such solutions though are efficient only if the print process is not started. Such technology is only useful in prioritizing print jobs waiting in queue and not for interrupting the print process already under process.

Another solution for the aforementioned problem was found with the introduction of advanced software of printer apparatuses that were capable of pausing a running print job for printing a priority print job and then resume to the printing of the previously running print job. The solution however, required human intervention. Also, the solution raised another problem related to security of the printed matter as it required humans to manually separate the printouts of the two print jobs. The task to find and separate one or two pages of a print job from thousand pages of another print job could be cumbersome and is prone to error.

Therefore, there exists a need for efficient methods and systems for prioritizing minor print jobs over large print jobs, but are also capable of segregating the printouts of the minor print jobs from the printouts of the large print jobs, without any human intervention.

SUMMARY

According to aspects illustrated herein, a control method for a printer apparatus to automatically print a high priority job by putting on hold an already printing job is disclosed. The control method includes detecting a trigger event caused by receiving a new print job while an old print job is already printing by the printer apparatus, the printer apparatus includes: a paper output slot for outputting and stacking printouts of the old print job in a paper collection area; a paper collection tray installed in the paper collection area for stacking printouts of the new print job; a tray moving system for moving the paper collection tray between an extended position and a retracted position in the paper collection area, wherein in the retracted position, the paper collection tray is above the paper output slot for outputting the old print job in the collection area, wherein in the extended position, the paper collection tray is below the paper output slot for outputting the new printed job to the paper collection area, into the paper collection tray. Then, printing of the old print job is paused and printing of the new print job is initiated. The collection tray is moved to the extended position and below the paper output stack for stacking printouts of the new print job into the paper collection tray. Thereafter, printing of the old print job is resumed. Finally, the collection tray is moved back to the retracted position and above the paper output slot for stacking printouts of the old print job in the collection area.

According to other aspects illustrated herein, a printer apparatus is disclosed. The printer apparatus includes: a paper output slot for outputting and stacking printouts of a first print job in a paper collection area; a paper collection tray installed in the paper collection area for stacking printouts of a second print job, the second print job is a high priority job as compared to the first print job; and a tray moving system for moving the paper collection tray between an extended position and a retracted position in the paper collection area, wherein the paper collection tray in the retracted position is above the paper output slot such that printouts of the first print job are stacked in the collection area, wherein the paper collection tray in the extended position is below the paper output slot and is configured for receiving the second print job to the paper collection area, into the paper collection tray, wherein printouts of the second print job stacked in the paper collection tray are physically segregated from printouts of the first print job stacked in the collection area.

According to other aspects illustrated herein, a printer apparatus is disclosed. The printer apparatus includes: a paper output slot for outputting and stacking printouts of a first print job in a paper collection area; a paper collection tray installed in the paper collection area for stacking printouts of a second print job; a tray moving system for moving the paper collection tray between an extended and a retracted position in the paper collection area; and a controller configured for detecting a trigger event caused by receiving the second print job while the first print job is already printing; pausing printing of the first print job; initiating printing of the second print job; instructing the tray moving system for moving the paper collection tray to the extended position for receiving printouts of the second print job into the paper collection tray; resuming printing of the first print job; and instructing the tray moving system for moving the paper collection tray to the retracted position for receiving printouts of the first print job below the paper collection tray in the collection area.

According to additional aspects illustrated herein, a method is disclosed. The method includes receiving a second print job while a first print job is being printed by a printer, the second print job is a high priority job as compared to the first print job. The printer includes: a collection tray installed in a collection area for receiving printouts of the second print job, the collection tray is configured to move between a retracted position and an extended position. Upon receiving, printing of the first print job is paused. And printing of the second print job is initiated. Thereafter, the collection tray is moved to the extended position for stacking printouts of the second print job into the paper collection tray. Then, printing of the first print job is resumed. Finally, the collection tray is moved back to the retracted position for stacking printouts of the first print job in the collection area.

Other and further aspects and features of the disclosure will be evident from reading the following detailed description of the embodiments, which are intended to illustrate, not limit, the present disclosure

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
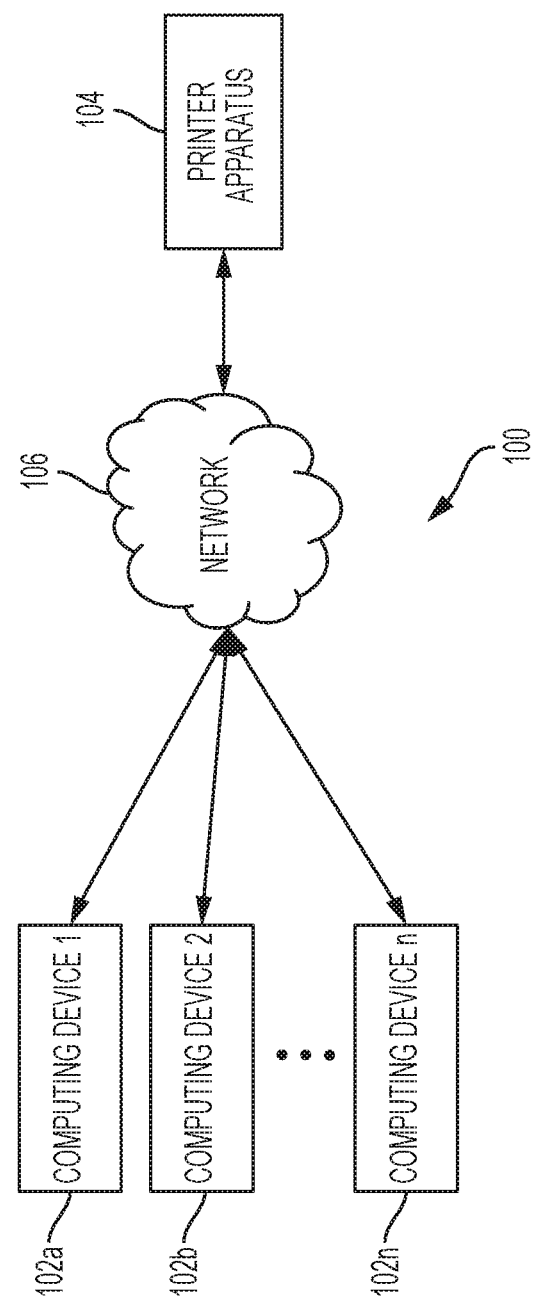
FIG. 1 illustrates a communication environment in which various embodiments of the present disclosure may function, in accordance with aspects of the embodiments.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "print job" or "job" refers to a print command submitted from a user to a printer apparatus for printing a document. The document may include one or more pages and may be of any pre-defined formats such as MS word, MS ppt, or the like. The print job is sent by the user from a computing device. The print job includes a first print job and a second print job.

The first print job represents a job of low priority, while the second print job represents a job of high priority as compared to the first print job. The first print job is referred to as an old print job, while the second print job is referred to as a new print job and these terms may be used interchangbly. The first print job may also be referred to as a large print job, while the second print job may be referred to as small/minor print job. Any print job having less number of pages as compared to other print jobs may be considered as a high priority job. In other scenarios, any print job requiring less time for printing as compared to other print job can be considered as a high priority job.

Further, as used herein, a "multi-function device" is a device or a combination of multiple devices that are configured to perform one or more functions such as, but not limited to, scanning, printing, cutting, imaging, and so forth. The multi-function device may include software, hardware, firmware, and combination thereof. The multi-function device may be a printer, scanner, or a combination thereof. For the discussion of the current disclosure, the multi-function device is considered as a printer. In the context of the present disclosure, the printer includes a paper collection tray configured to move between a retracted position and an extended position. In the extended position, the collection tray is configured to receive printouts of the new print job, i.e., a high priority job.

A "computing device" refers to a device for communicating and exchanging data, such as, but not limited to print jobs, with the printer. Further, the computing device is configured to connect to a network for interacting and exchanging data with the printer. Examples may include, but are not limited to, a phone, a smart phone, a tablet computer, a computer, a laptop, and any other suitable communication device.

Overview

The primary aim of the present disclosure is to print high priority jobs first as well as stack those separately from other print jobs, i.e., low priority jobs. To this end, the present disclosure discloses methods and systems for segregating printouts of minor print jobs from major print jobs. Specifically, the disclosure discloses a printer including a paper collection tray where printouts of high priority jobs are stacked. The printer includes a conventional collection area, where printouts of low priority jobs are stacked. In this manner, printouts of both the jobs are kept separately and thus, enable a user to easily separate and find out the printouts.

Exemplary Environment

FIG. 1 illustrates a communication environment 100 in which various embodiments of the present disclosure may function. As shown, the communication environment 100 includes a plurality of computing devices 102a, 102b . . . 102n (collectively referred to as computing devices 102) connected to a printer apparatus 104 via a network 106, wherein the numbers n and m are arbitrary numbers. The computing devices 102 may interchangbly be used with the phrase user devices. In place of the printer apparatus, a multi-function device may be used.

The computing device 102 is the device typically used by the user for performing his day to day activities like emails, social networking, surfing or the like. The computing devices 102 may operably be coupled to the network 106. Examples of the computing devices 102 may include, but are not limited to, a laptop, a smartphone, a mobile phone, a tablet, a phablet, a Personal Digital Assistant (PDA) or a combination thereof. Further, the computing devices 102 may represent any electronic device utilized by one or more users to access and communicate with the printer apparatus 104.

The network 106 may be a wired or a wireless network. The network 106 may be a wired network, wireless network or a combination of these. The network 106 may be an individual network or a collection of many such individual networks, interconnected with each other and functioning as a single large network, for example, the Internet or an intranet. The network 106 may be implemented as one of the different types of networks, such as intranet, local area network (LAN), wide area network (WAN), the internet, near field communication (NFC), and such networks. The network 106 may either be a dedicated network or a shared network, which represents an association of the different types of networks that use a variety of protocols. The network 106 may include network devices, such as network switches, hubs, routers, HBAs, for providing a communication link between the multi-function device 104 and other connected devices/systems.

The printer apparatus 104 is used for printing digital file on a medium, for example a digital document printed onto paper. Examples of the printer apparatus 104 may include, but are not limited to, a laser printer, an ink type printer, a thermal printer, a label printer, or other print devices, etc. The printer apparatus 104 may be a shared printer that is shared by all the computing devices 102 over the network 106. While the printer apparatus 104 may be a standalone printer. The printer apparatus 104 receives one or more print jobs, which may be added to a print queue and are printed on first come first basis. In the context of the current disclosure, the print jobs in the print queue are prioritized automatically by the printer apparatus 104 based on pre-set parameters and criteria. One example of the pre-set parameter and criteria may be based on number of pages to print, estimated amount of time required to print a job or the like. Here, high priority jobs are printed first and are kept separately from other print jobs. To this end, the printer apparatus 104 includes a paper collection tray to stack the high priority jobs and this will be discussed below in greater detail.

Figure 2:
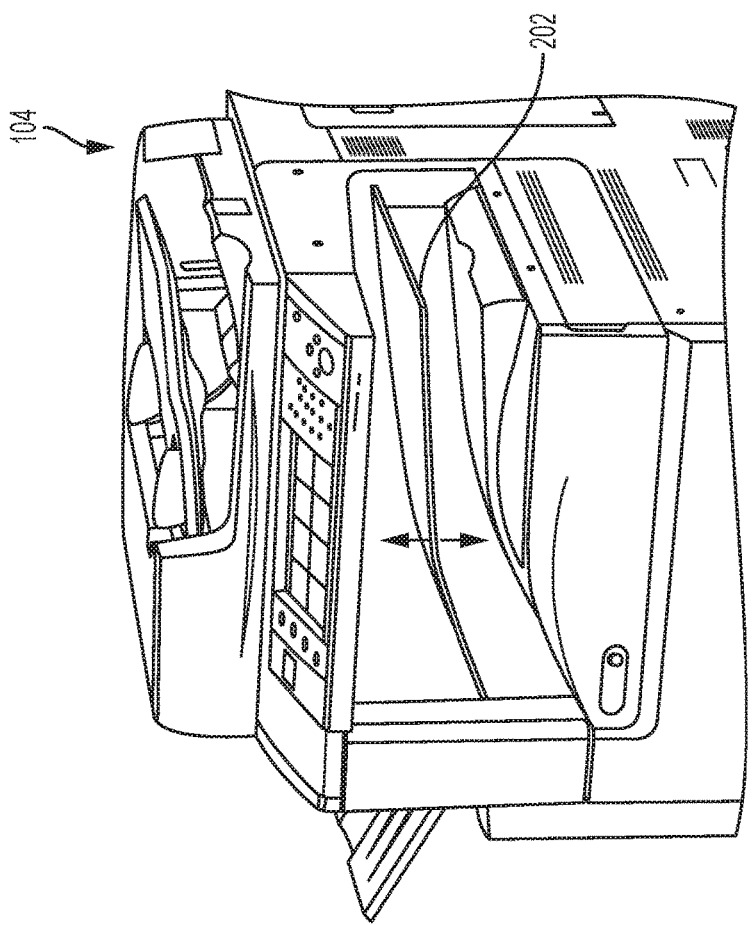
FIG. 2 illustrates a printer apparatus including a paper collection tray where various embodiments can be implemented.

Referring now to FIG. 2, a printer apparatus, such as the printer apparatus 104, as explained earlier in conjunction with FIG. 1 is illustrated. The printer apparatus 104 may be any regular printer apparatus that is additionally mounted with a paper collection tray such as a paper collection tray 202 in context of the current disclosure. The paper collection tray 202 is mounted in a paper collection area of the printer apparatus 104, wherein the paper collection area is used for stacking printed papers. In an embodiment, the paper collection tray 202 may be permanently coupled to the printer apparatus 104. While the paper collection tray 202 may be removably coupled to the printer apparatus 104. Hereinafter, the paper collection area will be referred as the area below the paper collection tray 202. In the paper collection area, printouts of a job (i.e., any print job which is a low priority or a normal priority) are stacked.

Although not marked in FIG. 2, the printer apparatus 104 includes a paper output slot for outputting and stacking printouts of a print job in a paper collection area. Typically, all printouts from the printer apparatus 104 are stacked up in the paper collection area. Therefore, if more than one print job is stacked in the paper collection area, human intervention is required for separating printouts of different print jobs. To avoid human intervention and to completely automate the segregation process of printouts, the paper collection tray 202 and tray moving system are introduced.

As mentioned, the printer apparatus 104 includes the tray moving system (not shown) installed therein for moving the paper collection tray 202 on vertical axis. The tray moving system includes connectors for receiving/holding the paper collection tray 202. Further, the connectors may be moved on an axis with the help of an electric motor for firmly moving the paper collection tray 202 on the axis. Depending on the design of the printer apparatus 104, the tray moving system may be designed to move the paper collection tray 202 in any direction or on any axis. However, considering the conventional design of the printer apparatus 104 that uses gravitational forces to stack up printing papers at base of the paper collection area, but in context of the current disclosure, the paper collection tray 202 is moved up and down on vertical axis for collecting selective printouts on the paper collection tray 202. The tray moving system may be designed to move the paper collection tray 202 up and down in front of the paper output slot. The functioning of the tray moving system may be in accordance with priority queue of the printer apparatus 104.

The tray moving system moves the paper collection tray 202 between a first position (i.e., a retracted position) and a second position (i.e., an extended position) in the paper collection area. In the first position, the paper collection tray 202 is positioned above the paper output slot such that printouts of a low priority job are stacked in the paper collection area. While in the second position, the paper collection tray 202 is positioned below the paper output slot and is configured for receiving printouts of a high priority job into the paper collection tray 202.

The paper collection tray 202 is detachably installed in the paper collection area. In another embodiment, the paper collection tray 202 is built with a lightweight material for enabling the tray moving system to move the paper collection tray 202 with low power. The light weight material may be any material used for building electronic apparatuses. The low power refers to a lowest power that is required to drive a state of the art electric motor for moving the paper collection tray 202 along with weight of the paper printouts stacked on it. The low power may or may not vary according to the weight of the paper printouts stacked on the paper collection tray 202.

The printer apparatus 104 receives one or more print jobs. The print jobs may be received from a single user or may be received from multiple users. The print jobs received from the users are queued at the printer apparatus 104. In the context of the current disclosure, the printer apparatus 104 automatically determines whether a received print job is a high priority job as compared to the previously received print job. Based on the determination, the high priority job is printed first and is stacked separately, i.e., in the paper collection tray 202. For simplicity, the disclosure is explained with the help of an example, where the printer apparatus 104 receives a first print job and a second print job, where the second print job is a high priority job.

For example, printouts of the first job from the printer apparatus 104 are conventionally stacked into the paper collection area, i.e., below the paper collection tray 202. If the second job is required to be printed in between the print process of the first job, the first job is paused, the tray moving system lowers the paper collection tray 202 just below the paper output slot for receiving the printouts of the second print job from the paper output slot. After collecting all printouts of the second print job, the tray moving system uplifts the paper collection tray 202 to a position above the paper output slot. Thereafter, the print process of the first job is resumed to stack the pending printouts on and over the previously printed and stacked printouts of the first job. This way, printouts of the first and second print jobs are physically segregated without any human intervention and with complete automation.

The printer apparatus 104 is configured to generate an alert if the paper collection tray 202 is determined to be empty or non-empty, depending on requirements. For example, if the printer apparatus 104 needs to print a high priority job by pausing a low priority job that is in progress, then the printer apparatus 104 may first check whether the paper collection tray 202 is empty or not. If the paper collection tray 202 is found to be non-empty then the printer apparatus 104 may not print the high priority job as the printouts of the high priority job may get mixed with the already stacked printouts in the paper collection tray 202. To avoid the mix-up, the printer apparatus 104 may generate an alert for a user to collect the printouts from the paper collection tray 202. The alert may be in the form of a text message, an alarm message, an audio message, or a combination thereof. The alert may be displayed or played on the printer apparatus 104 itself. While, the alert may also be sent to an authorized personnel over the network 106.

The printer apparatus 104 additionally includes a sensor for monitoring whether the paper collection tray 202 is empty or is stacked with printed papers. The sensor may be any state of the art sensor that is capable of performing the required function of detecting whether the paper collection tray 202 is empty or not. For exemplary purpose, the sensor may be any, but is not limited to, a light sensor, an ultrasonic sensor, an image sensor, a radio wave sensor, a weight sensor, a proximity sensor, etc. In an embodiment, the sensor may be replaced with a software flag or a trigger event that is used for (digitally) detecting whether a printout is outputted to the paper collection tray 202 or not.

Figure 3:
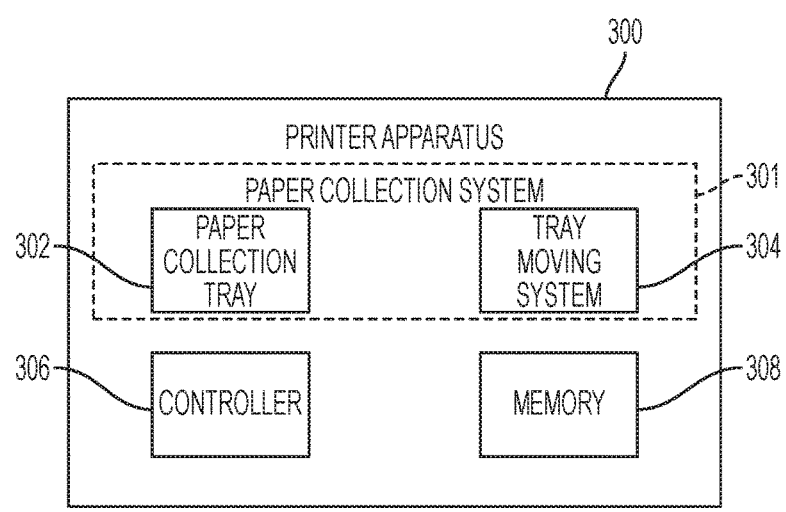
FIG. 3 illustrates a block diagram of a printer apparatus, in accordance with aspects of the embodiments.

FIG. 3 illustrates a block diagram of a printer apparatus 300 similar to the printer apparatus 104 as explained in conjunction with FIGS. 1 and 2 of the present disclosure. As shown, the printer apparatus 300 includes a paper collection system 301 including a paper collection tray 302, a tray moving system 304, a controller 306 and a memory 308. Each component 302, 304, 306, and 308 is communicatively coupled to each other for implementing the current disclosure. The printer apparatus 300 also includes a network adapter (not shown) for connecting with the network 106 (as explained earlier in conjunction with FIG. 1). For example, the printer apparatus 300 may be connected to a computing device over the network 106.

The paper collection system 301 includes a paper output slot (although not shown). The paper output slot is configured for outputting and stacking printouts of a first job in a paper collection area, where the paper collection area is an area where printouts of a low priority job or a normal priority job are stacked generally. Once stacked, the user collects the printouts.

The paper collection tray 302 is installed in the paper collection area for stacking printouts of jobs which are high priority jobs as determined by the controller 306. The paper collection tray 302 is configured to move between a retracted position and an extended position. In the retracted position, the paper collection tray 302 is above the paper output slot such that printouts of the low priority are stacked in the collection area. In the extended position, the paper collection tray 302 extends below the paper output slot and the paper collection tray 302 is configured to receive printouts of jobs which are of high priority. By default, the paper collection tray 302 remains in the retracted position. The paper collection tray 302 is detachably mounted in the paper collection area. The tray moving system 304 automatically moves the paper collection tray 302 between the retracted position and the extended position. In other cases, the paper collection tray 302 may be designed to be manually pushed up and down between the extended position and retracted position or vice versa. The tray moving system 304 includes a sensor for monitoring whether the paper collection tray 302 is empty.

The controller 306 comprises instructions/computer program which when executed on the printer apparatus 300 installed with a detachable and moveable paper collection tray 302 causes the printer apparatus 300 to handle high priority jobs by printing those first as compared to low priority jobs which are already under printing. The controller 306 detects a trigger event caused by receiving a new print job while an old print job is already under process. The new print job is the high priority job as compared to the old print job. The old print job is referred to as a first print job and the new print job is referred to as a second print job. The controller 306 then pauses printing of the old print job, and further sends instruction to the tray moving system 304 for moving the paper collection tray 302 from the default position, i.e., retracted position to an extended position (i.e., below a paper output slot), where printouts of the new print job are stacked into the paper collection tray 302. In the extended position, printouts of the new print jobs are stacked in the paper collection tray 302.

The controller 306 then resumes printing of the old print job. The controller 306 further sends instruction to the tray moving system 304 for moving the paper collection tray 302 from the extended position back to the retracted position (i.e., above the paper output slot), where printouts of the old print job are stacked in the paper collection area.

The controller 306 generates an alert if the paper collection tray 302 is not empty. The alert is generated for the user to collect the stacked printouts from the paper collection tray 302.

The memory 308 may either be a primary memory or a secondary memory. Examples of the memory 308 may include, but are not restricted to Random Access Memory (RAM), cache memory, Hard Disk Drive (HDD), Solid State Drive (SSD), Compact Disk (CD), and portable memories. The memory 308 may store print history, copy of documents printed or to be printed, and other details related to the printed documents. Further, the memory 308 stores certain pre-defined rules pertaining to print parameters or print criteria. The pre-defined rules may be used to determine or calculate priorities of received print jobs. The pre-defined rules may further be used to determine action plans based on whether the collection tray 302 is empty or not. The pre-defined rules may further be used to determine whether a print job is to be paused or resumed. The pre-defined rules may further be used to determine whether an alert is to be generated or not.

Figure 4:
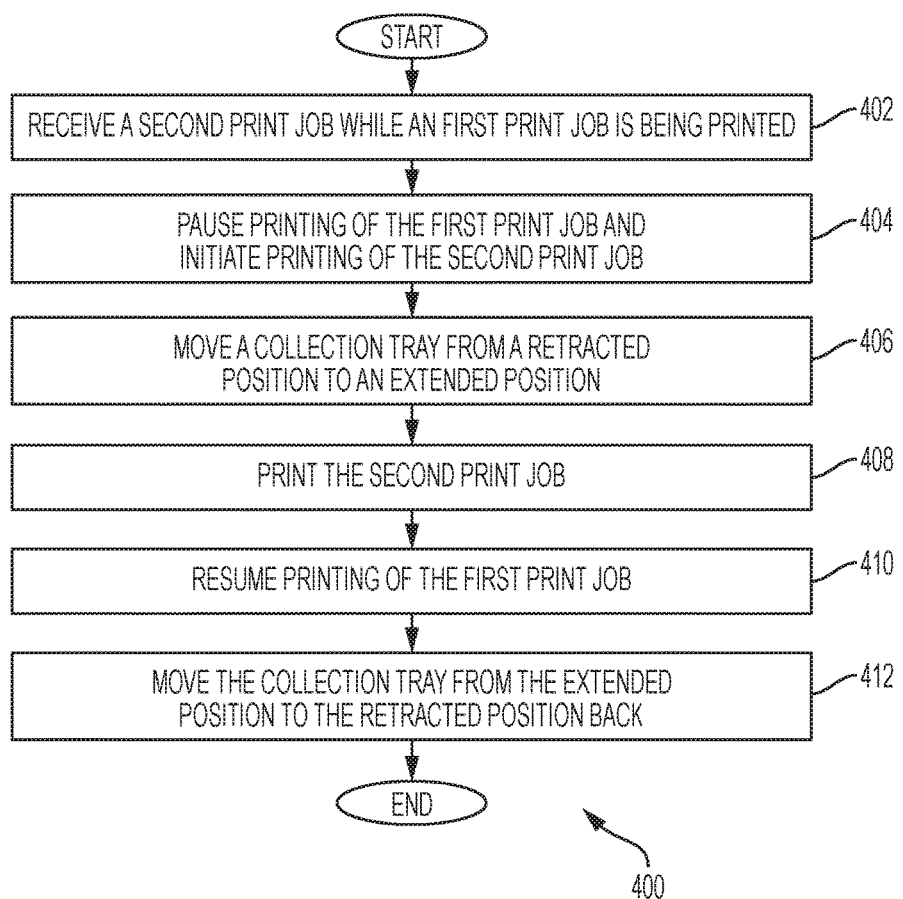
FIG. 4 illustrates a flow diagram of a method for physically segregating printouts of two different print jobs in a printer apparatus.

FIG. 4 illustrates a flow diagram 400 of a method for physically segregating printouts of two different print jobs in a printer apparatus, in accordance with an aspect of the embodiments. Specifically, the flow diagram 400 is a control method for the printer apparatus to automatically print a high priority job by putting on hold an already printing job. The method further is implemented when the printer apparatus includes a detachable and movable paper collection tray designed only for collecting printouts of high priority jobs, while printouts of the low priority job are stacked as conventionally, i.e., in a paper collection area. In this manner, the high priority job (i.e., printouts of the high priority job) is physically segregated from the low priority job (i.e., printouts of the low priority job). Functional and structural details of the collection tray and associated system are discussed above in detail.

The method begins when a user submits a print job for printing. The print job is considered as a first print job. The first print job may be a document of any format and may include a plurality of pages. Upon receiving, printing of the first job is initiated, where some pages are printed, while remaining pages are under printing. While printing the first print job, at 402 a new print job is received, i.e., the new print job is considered as a second print job. It is then determined whether the second print job is a high priority job based on the number of pages, estimated time for printing, or otherwise marked as a high priority job by the user. These are just few examples, other known or later developed ways may be used for determining whether the new job is a high priority job as compared to the previous.

Based on the determination, it is found that the second print job is a high priority job. For example, if it is determined that the estimated amount of time for printing the second print job is below a threshold level then the second print job is considered first for printing by pausing the printing process of the first print job. The threshold level may be determined based on estimated time required to complete the print process of the first print job.

For example, the printer apparatus may check if TN+TT<TO then the second print job is printed first. Herein TN refers to estimated time required to print the second print job, TT refers to a pre-set threshold time period, and TO refers to estimated time required to print the first print job. In an embodiment, the printer apparatus may consider total number of print pages required to print for the first print job and for the second print job to determine whether to allow the second print job to interrupt the printing of the old print job. For example, the printer apparatus may check if PN+PT<PO then second print job is printed first. Herein PN refers to pages to print for the second print job, PT refers to any arbitrary number of pages, and PO refers to pages pending to print for the first print job. In another embodiment, the printer apparatus may be configured to prefer a print job that needs less number of printouts or required less amount of time for completing the job, in comparison to other print jobs waiting in a print queue or already under print process. These are just few examples, while the priority may be defined by the printer apparatus in real-time based on any other parameters not necessarily mentioned above.

The first print job and the second print job may be received from a single user. While the first print job and the second print job may belong to different users.

At the time of receiving the second print job, a sensor is activated to monitor the collection tray. In particular, the sensor monitors the tray status, i.e., whether the tray is empty or not. If not empty, an alert may be sent to a user for clearing the tray.

At 404, printing of the first print job is paused and also printing of the second print job is initiated. Then at 406, the collection tray is moved from the retracted position to the extended position. In the extended position, the collection tray is configured to stack or receive all the printouts of the second print job. The second print job is initiated only when the paper collection tray is empty. At 408, the second print job is printed completely. In this manner, all printouts of the high priority job are stacked separately from printouts of the first print job.

After completion of printing of the second print job, an alert is generated for the user to collect the printouts of the second print job. Once the printouts of the second print job are collected by the user, then at 410, printing of the first print job is resumed. At 412, the collection tray is moved back from the extended position to the retracted position. The first print job is resumed when the paper collection tray moves back to the retracted position. Here, printing of the first print job is continued until completed. The printouts of the first print job are stacked freely in the collection area. As mentioned above, printouts of the second print job are stacked in the paper collection tray and printouts of the first print job are stacked in the paper collection area. In this manner, printouts of the first print job are kept physically separately from the second print job so that these are not mixed.

The method additionally includes sensing or monitoring whether the collection tray is empty or is stacked with papers. If the collection tray is found to be stacked with printouts, then an alert is generated for the user who submitted the print request for the second print job initially. The alert is generated for the user to collect the printouts of the second print job and clear the collection tray. If the collection tray is found to be empty, then the collection tray is moved to the extended position.

The method further includes at the time of receiving the second print job, a sensor may be activated to monitor the collection tray. In such cases, the collection tray may be moved to its extended position only if the collection tray is empty. In case the collection tray is found not empty, the second print job may not be initiated for printing unless the collection tray is determined to be empty. Furthermore, the old print job may not be paused unless the collection tray is determined to be empty by the sensor. Moreover, the old print job may not be resumed for printing unless the collection tray moves back to its retracted position.

For understanding purposes, two jobs i.e., a first job and a second job are discussed. However, it is understood that the disclosure may be implemented for more than two print jobs received from multiple users or from a single user.

Example

An example is discussed for easy understanding of the disclosure. It is considered that a job of 30 pages is received. Upon receiving, the printer starts the printing and 5 pages are printed. The printed pages or printouts of the first job are stacked in a collection area. While printing, the printer receives a new job of 2 pages. The printer determines whether the new received job is of high priority or not. Based on the determination, the printer identifies the received job is a high priority job. In such a case, the printer pauses the first job and starts printing the second job. Here, the collection tray is moved from a retracted position to an extended position. Here, printouts of the second job are received in the collection tray. And then, the tray is moved back to the retracted position and printing of the first job is resumed, i.e., printing of the remaining 25 pages is initiated. And finally, the remaining 25 pages are stacked in the collection area.

The present disclosure discloses methods and systems for physically segregating printouts of large print jobs and minor print jobs. Specifically, the disclosure prioritizes the minor print jobs and prints them first by putting the large print jobs on hold. Along with this, the minor print jobs are stacked separately in a collection tray so that the printouts are not mixed with printouts of large print job or other print jobs. In this manner, the disclosed methods and systems save a lot of time of a user. The discloses methods and systems are efficient in a way that no human intervention is required for prioritizing the received jobs or for stacking printouts in the collection tray.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "determining," or "receiving," or "moving," or "printing," or "resuming," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A control method for a printer apparatus to automatically print a high priority job by putting on hold an already printing job, the method comprising:
   detecting a trigger event caused by receiving a new print job while an old print job is already printing by the printer apparatus, the new print job is a high priority print job and the old print job is of comparatively low priority, wherein the printer apparatus comprises:
      a paper output slot for outputting and stacking printouts of the low priority print job in a paper collection area;
      a dedicated paper collection tray installed in the paper collection area for stacking selective printouts of the high priority print job only, wherein the printouts of the high priority print job are stacked separately in the paper collection tray so that the printouts of the high priority print job are not mixed with printouts of the low priority print job; and
      a tray moving system for moving the paper collection tray between an extended position and a retracted position in the paper collection area,
      wherein in the retracted position, the paper collection tray is above the paper output slot for outputting the low priority print job in the collection area,
      wherein in the extended position, the paper collection tray is below the paper output slot for outputting the high priority print job to the paper collection area, into the paper collection tray;
   pausing printing of the low priority print job;
   initiating printing of the high priority print job;
   moving the paper collection tray to the extended position and below the paper output slot for stacking printouts of the high priority print job into the paper collection tray;
   resuming printing of the low priority print job; and
   moving the paper collection tray back to the retracted position and above the paper output slot for stacking printouts of the low priority print job in the collection area,
   wherein the control method facilitates automatic segregation of printouts of two different print jobs.

2. The control method of claim 1, wherein the printouts of the high priority print job are stacked in the paper collection tray and printouts of the low priority print job are stacked below the collection tray and in the paper collection area.

3. The control method of claim 1 further comprising monitoring whether the paper collection tray is empty.

4. The control method of claim 3, wherein the paper collection tray is moved to the extended position if the paper collection tray is empty.

5. The control method of claim 1, further comprising generating an alert when the paper collection tray is not empty.

6. The control method of claim 1 further comprising activating the sensor when the high priority print job is received for printing.

7. The control method of claim 1, wherein the high priority print job is initiated only when the paper collection tray is empty.

8. The control method of claim 1, wherein the low priority print job is resumed when the paper collection tray moves back to the retracted position.

9. The control method of claim 1, wherein the paper collection tray is designed to be manually pushed up and down between the extended position and retracted position.

10. The control method of claim 1 further comprising:
    determining that the new print job is a higher priority job than the old print job, based on at least one of:
       comparing an estimated amount of time for printing the new print job and an estimated amount of time for printing remaining of the old print job; and
       comparing number of pages of the new print job and number of pages remaining of the old print job.

11. A printer apparatus comprising:
    a paper output slot for outputting and stacking printouts of a first print job in a paper collection area;
    a dedicated paper collection tray installed in the paper collection area for stacking selective printouts of a second print job only, the second print job is a high priority print job and the first print job is of comparatively low priority; and
    a tray moving system for moving the paper collection tray between an extended position and a retracted position in the paper collection area,
    wherein the paper collection tray in the retracted position is above the paper output slot such that printouts of the low priority print job are stacked in the collection area,
    wherein the paper collection tray in the extended position is below the paper output slot and is configured for receiving the high priority print job to the paper collection area,
    wherein the printouts of the high priority print job stacked in the paper collection tray are physically segregated from the printouts of the low priority print job stacked in the collection area.

12. The printer apparatus of claim 11, wherein the paper collection tray is moved manually.

13. A printer apparatus comprising:
    a paper output slot for outputting and stacking printouts of a first print job in a paper collection area;
    a dedicated paper collection tray installed in the paper collection area for stacking selective printouts of a second print job only, the second print job is a high priority print job and the first print job is of comparatively low priority, wherein the printouts of the high priority print job are stacked separately in the paper collection tray so that the printouts of the high priority print job are not mixed with printouts of the low priority print job;
    a tray moving system for moving the paper collection tray between an extended and a retracted position in the paper collection area; and
    a controller configured for:
       detecting a trigger event caused by receiving the high priority print job while the low priority print job is already under printing;
       pausing printing of the low priority print job;
       initiating printing of the high priority print job;
       instructing the tray moving system for moving the paper collection tray to the extended position for receiving the printouts of the high priority print job into the paper collection tray;
       resuming printing of the low priority print job; and
       instructing the tray moving system for moving the paper collection tray to the retracted position for receiving the printouts of the low priority print job in the collection area.

14. The printer apparatus of claim 13, wherein the paper collection tray in the retracted position is above the paper output slot.

15. The printer apparatus of claim 13, wherein the paper collection tray in the extended position is below the paper output slot.

16. The printer apparatus of claim 13, wherein the paper collection tray is detachably mounted in the paper collection area.

17. The printer apparatus of claim 13 further comprising a sensor for monitoring whether the paper collection tray is empty.

18. The printer apparatus of claim 17, wherein the paper collection tray is moved to the extended position if the paper collection tray is empty.

19. The printer apparatus of claim 13, wherein the paper collection tray is designed to be manually pushed up and down between the extended position and the retracted position.

20. A method comprising:
receiving a second print job while a first print job is being printed by a printer, the second print job is a high priority print job and the first print job is of comparatively low priority, the printer comprises:
a dedicated collection tray installed in a collection area for receiving selective printouts of the high priority print job only, wherein the printouts of the high priority print job are stacked separately in the paper collection tray so that the printouts are not mixed with printouts of the low priority print job, the collection tray is configured to move between a retracted position and an extended position;
pausing printing of the low priority print job;
initiating printing of the high priority print job;
moving the collection tray to the extended position for stacking the printouts of the high priority print job into the paper collection tray;
resuming printing of the low priority print job; and
moving the collection tray from the extended position to the retracted position for stacking printouts of the low priority print job in the collection area.

* * * * *